United States Patent
Callas et al.

(10) Patent No.: US 7,543,440 B2
(45) Date of Patent: Jun. 9, 2009

(54) MULTIPLE TURBINE SYSTEM WITH A SINGLE RECUPERATOR

(75) Inventors: James J. Callas, Peoria, IL (US); Kevin L. Martin, Washburn, IL (US); Cody P. Renshaw, Peoria, IL (US); Thomas M. Sopko, Jr., East Peoria, IL (US); Andrew J. Tonsor, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 521 days.

(21) Appl. No.: 11/305,112

(22) Filed: Dec. 19, 2005

(65) Prior Publication Data

US 2007/0137211 A1     Jun. 21, 2007

(51) Int. Cl.
*F02C 7/10* (2006.01)
(52) U.S. Cl. .................... 60/39.511; 60/39.15
(58) Field of Classification Search ........... 60/39.511, 60/785, 39.15; 165/4
See application file for complete search history.

(56) References Cited

U.S. PATENT DOCUMENTS

| | | | |
|---|---|---|---|
| 2,814,181 A * | 11/1957 | Schwartz | 60/39.15 |
| 4,031,953 A * | 6/1977 | Kline | 165/166 |
| 4,147,024 A * | 4/1979 | Moellmann | 60/39.15 |
| 4,249,378 A * | 2/1981 | Benson | 60/525 |
| 4,870,816 A | 10/1989 | Nakhamkin | |
| 5,004,044 A | 4/1991 | Horgan et al. | |
| 5,347,806 A | 9/1994 | Nakhamkin | |
| 5,386,688 A | 2/1995 | Nakhamkin | |
| 5,586,429 A | 12/1996 | Kesseli et al. | |
| 5,799,484 A * | 9/1998 | Nims | 60/39.15 |
| 6,050,082 A | 4/2000 | Leonard et al. | |
| 6,178,735 B1 | 1/2001 | Frutschi | |
| 6,574,950 B2 | 6/2003 | Nash | |
| 6,612,113 B2 * | 9/2003 | Guillard | 60/783 |
| 6,901,759 B2 | 6/2005 | Frutschi | |
| 6,931,856 B2 | 8/2005 | Belokon et al. | |
| 2005/0098309 A1 * | 5/2005 | Kang et al. | 165/166 |

FOREIGN PATENT DOCUMENTS

| | | |
|---|---|---|
| WO | WO/2004/057170 A1 | 7/2004 |
| WO | WO/2005/095773 A1 | 10/2005 |

* cited by examiner

*Primary Examiner*—Michael Cuff
*Assistant Examiner*—Phutthiwat Wongwian
(74) *Attorney, Agent, or Firm*—Finnegan, Henderson, Farabow, Garrett & Dunner

(57) ABSTRACT

A turbine system is provided including a plurality of gas turbine engines, each having a compressor section for producing compressed air, a combustor section, and a turbine section yielding hot exhaust gas. A single, common recuperator section is shared by and operatively associated with the plurality of gas turbine engines. A first flow path within the single, common recuperator section is configured to receive compressed air produced by the compressor section of each gas turbine engine. A second flow path, separated from the first flow path and within the single, common recuperator section is configured to receive hot exhaust gases yielded by the turbine section of each gas turbine engine.

15 Claims, 4 Drawing Sheets

MULTIPLE TURBINE SYSTEM WITH A SINGLE RECUPERATOR

TECHNICAL FIELD

The present disclosure relates generally to a multiple turbine operating method and system and, more particularly, to a work machine having multiple gas turbine engines with a single recuperator.

BACKGROUND

Work machines such as, for example, on-highway and off-road haulage vehicles, wheeled tractors, track type tractors, and various construction work machines, may receive motive power from one or more of different types of engines. For example, a work machine may be powered by one or more gasoline engines, one or more diesel engines, or one or more gas turbine engines. Work machines powered by one or more gas turbine engines may use the one or more gas turbine engines to drive a mechanism or mechanisms that may be used to transfer engine power output into work machine propulsion or other work machine operations.

A gas turbine engine may include a compressor section, a combustor section, and a turbine section. Air may be inducted into the compressor section to be suitably compressed. Subsequently, the compressed air may be delivered from the compressor section to the combustor section. Compressed air and fuel may be ignited in the combustor section to create hot exhaust gases. Hot exhaust gases exiting the combustor section may be delivered to the turbine section to be driven by the expansion of the hot gases. The mechanical power from the turbine section may then be used to drive the compressor section by way of a suitable shaft or other drive arrangement. At the same time, the power from the turbine section may be used to drive a suitable mechanism such as, for example, a generator.

A gas turbine engine may also include a recuperator section. A recuperator section may be used to recover, or recuperate, heat from hot exhaust gases that might otherwise be lost to the atmosphere. The recuperator section may include flow paths for hot exhaust gases passing from the turbine section, and flow paths for compressed air passing from the compressor section to the combustor section. In this way, there may be an exchange of heat between the hot exhaust gases and the relatively cooler compressed air whereby the compressed air is elevated in temperature before entering the combustor section and the hot exhaust gases are lowered in temperature before entering the atmosphere.

Where multiple gas turbine engines are used in a system, each of a plurality of gas turbine engines may be provided with its own recuperator section providing flow paths for the compressed air and hot exhaust gases of only that particular gas turbine engine. Fluctuations in power demands requiring one or more of a plurality of gas turbine engines to be shut down periodically would ordinarily dictate that the associated recuperator section or sections for the one or more gas turbine engines would be unused during shut down. For fluctuating power demands requiring one or more of a plurality of gas turbine engines to be shut down periodically, it would be useful to provide a system, structure, and method whereby multiple gas turbine engines could operate economically and efficiently with a single, common recuperator section.

One system involving multiple turbines and recuperators is described in U.S. Pat. No. 5,799,484 (the '484 patent) issued to Nims on Sep. 1, 1998. The '484 patent describes a system using a single combustor, single fuel supply system, and single electronic unit for two turbogenerators. The '484 patent provides a compressor and a turbine for each of the two turbogenerators. In addition, first and second recuperators for the two turbogenerators are arranged such that the entire recuperator volume of the two recuperators may be used for both single and dual turbogenerator operating modes.

Although the system described in the '484 patent may disclose using the entire recuperator volume of two recuperators for the flow of exhaust gases, both when operating one or both of the disclosed turbogenerators, the '484 patent maintains independent flow paths for the compressed air delivered by the two compressors of the two turbogenerators which is to be heated within the recuperator.

When the system of the '484 patent operates in a single turbogenerator mode, the flow path for compressed air in the recuperator for the idle turbogenerator is connected by way of a valve to serve the operating turbogenerator. However, the flow path for compressed air is not shared during the dual turbogenerator mode. Moreover, the '484 patent does not recognize grouping multiple gas turbine engines adjacent a common, shared recuperator. Rather, the '484 patent contemplates a single gas turbine engine, with one combustor, having plural compressors and turbines with separate recuperators, without full sharing of both the exhaust and compressed air flow paths within the recuperators.

The disclosed multiple turbine system and method with a single, common recuperator is directed to overcoming one or more of the problems outlined above with respect to existing technology.

SUMMARY OF THE INVENTION

In one aspect, the present disclosure includes a turbine system comprising a plurality of gas turbine engines. Each gas turbine engine has a compressor section for producing compressed air, a combustor section, and a turbine section yielding hot exhaust gases. A single, common recuperator section is shared by and operatively associated with the plurality of gas turbine engines. A first flow path within the single, common recuperator section is configured to receive compressed air produced by the compressor section of each gas turbine engine. A second flow path, separated from the first flow path and within the single, common recuperator section is configured to receive hot exhaust gases yielded by the turbine section of each gas turbine engine.

In another aspect, the present disclosure includes a method of operating a system including a plurality of gas turbine engines. The method comprises driving at least one mechanism with a plurality of gas turbine engines, each gas turbine engine having a compressor section, a combustor section, and a turbine section. The method also comprises directing compressed air from the compressor section of each of the plurality of gas turbine engines through a first flow path within a single recuperator section common to and shared by each of the gas turbine engines. The method further comprises directing hot exhaust gases from the turbine section of each of the plurality of gas turbine engines through a second flow path separate from the first flow path and within the recuperator section.

It is to be understood that both the foregoing general description and the following detailed description are exemplary and explanatory only and are not restrictive of the claims.

DETAILED DESCRIPTION

Figure 1:
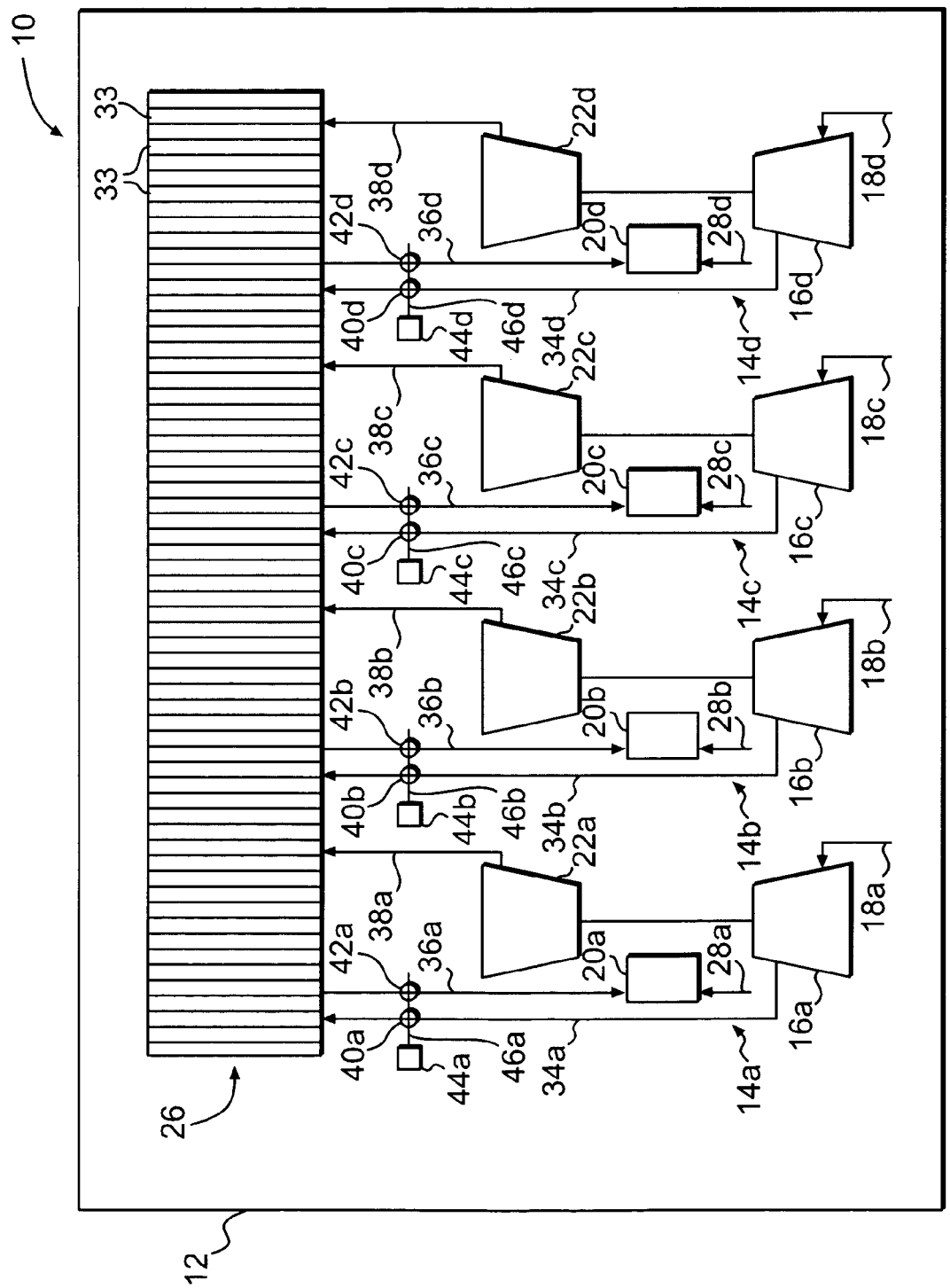
FIG. 1 is a diagrammatic and schematic illustration of an embodiment of a work machine powered by a plurality of gas turbine engines and having a single, common recuperator section for the engines.

FIG. 1 diagrammatically illustrates an exemplary work machine 10. Work machine 10 includes a chassis 12, generally designated by the rectangular outline in FIG. 1, and may be, for example, a track-type tractor, a track-type loader, a hydraulic excavator, a mining truck, a wheel loader, an off-road haulage vehicle, an on-highway truck, or any other work machine known to those skilled in the art. The particular type of work machine involved is generally incidental to the system disclosed. Those having skill in the art readily will be able to apply the disclosed system and method to various types of work machines once apprised of the herein disclosed embodiments.

Throughout this disclosure, in discussing the various embodiments, reference will be made to multiple gas turbine engines and to the various components that may be associated with the gas turbine engines. In doing so, the same reference numeral will be used for like parts of the several gas turbine engines. But for each separate gas turbine engine, or component associated therewith, the reference numeral will be accompanied by character designations to separately identify different gas turbine engines or associated components thereof. For example, in a given embodiment, there will be gas turbine engine 14a, gas turbine engine 14b, gas turbine engine 14c, etc. Collectively these will be referred to as gas turbine engines 14a-b, or gas turbine engines 14a-c, as the case may be.

Referring first to FIG. 1, work machine 10 may include a plurality of gas turbine engines 14a, 14b, 14c, 14d serving as a power source for the work machine. Each gas turbine engine 14a-d may include a compressor section 16a-d configured to draw in air during operation and configured to compress the air drawn in. Air for compressor section 16a-d may be provided via a flow path diagrammatically shown and designated 18a-d. Flow path 18a-d may or may not include a conduit or other enclosure for the flow of air. Each gas turbine engine 14a-d may also include a combustor section 20a-d and a turbine section 22a-d.

Figure 3:
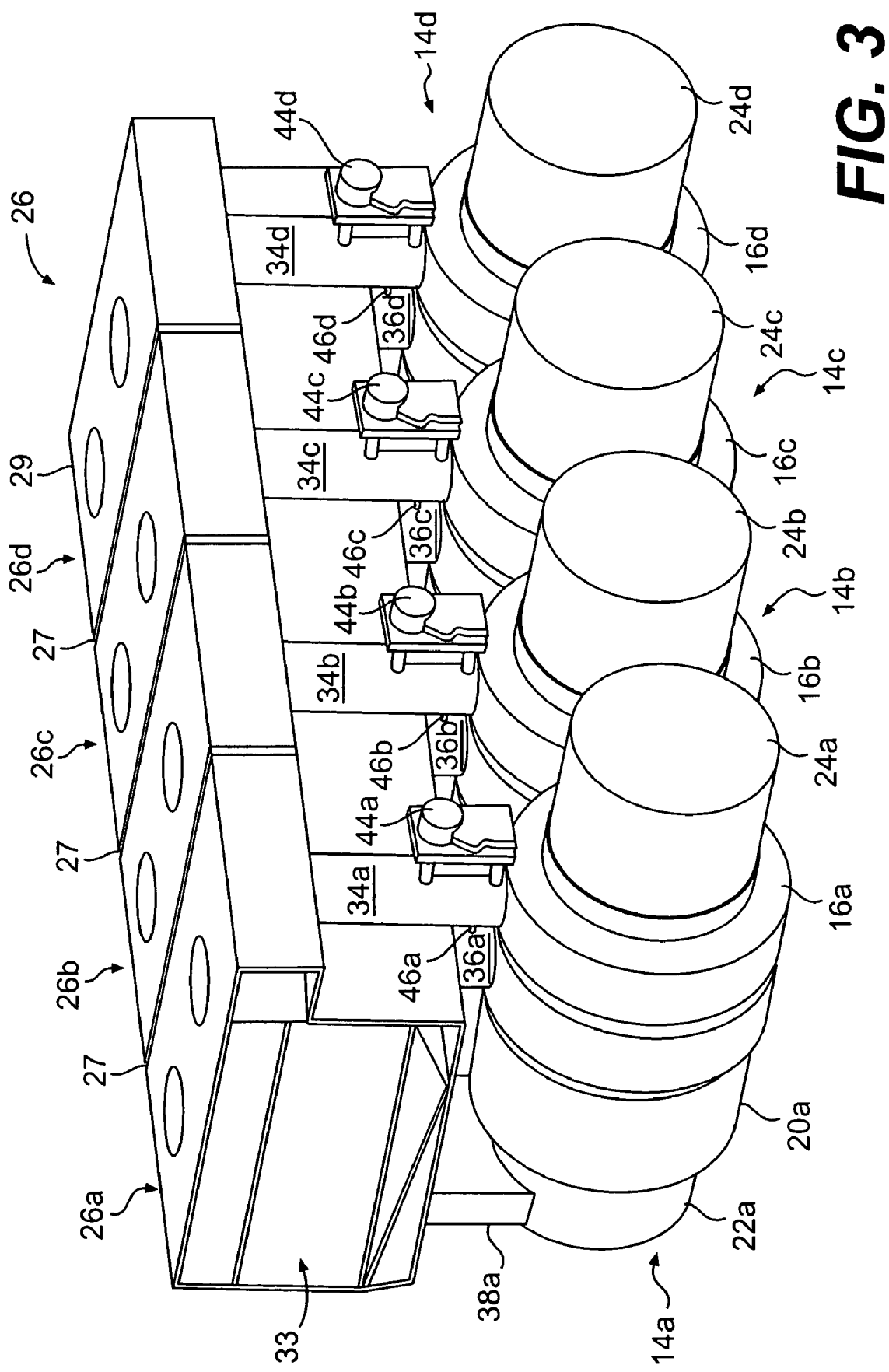
FIG. 3 is a diagram of an embodiment of a plurality of gas turbine engines in a linear-pack configuration and having a single, common recuperator section.

The plurality of gas turbine engines 14a-d may collectively drive a mechanism, or plural mechanisms, or they may individually drive separate mechanisms. Referring momentarily to FIG. 3, each gas turbine engine 14a-d may drive a mechanism 24a-d which may include a generator, and the plural generators may in turn provide power for one or more electric motors (not shown) on the work machine 10. Alternatively, the plurality of gas turbine engines 14a-d may be mechanically geared together to drive a common mechanism. The mechanism or mechanisms driven may be mechanical, hydraulic, or electric.

Returning to FIG. 1, work machine 10 may include a recuperator section 26 for the gas turbine engines 14a-d configured to heat compressed air received from compressor sections 16a-d. The recuperator section 26 may derive heat from hot exhaust gases yielded by turbine sections 22a-d as the hot exhaust gases pass through the recuperator section 26 before entering the atmosphere. Combustor sections 20a-d may be configured to receive heated, compressed air from the recuperator section 26. The combustor sections 20a-d may be provided with fuel from, for example, fuel injection devices schematically shown at 28a-d. Ignition and burning of the heated, compressed air and fuel creates an exhaust gas with high energy. Turbine sections 22a-d of gas turbine engines 14a-d are configured to convert energy from the hot exhaust gases into mechanical energy when the hot exhaust gases pass through turbine sections 22a-d.

Work machine 10 may include but a single, common recuperator section 26 for the multiple gas turbine engines 14a-d. The single, common recuperator section 26 is configured to heat compressed air received from each of the plurality of compressor sections 16a-d. The single, common recuperator section 26 may include a first flow path for compressed air and a second flow path for hot exhaust gases, each flow path separated from the other but in heat transfer relationship, one with the other.

Figure 2:
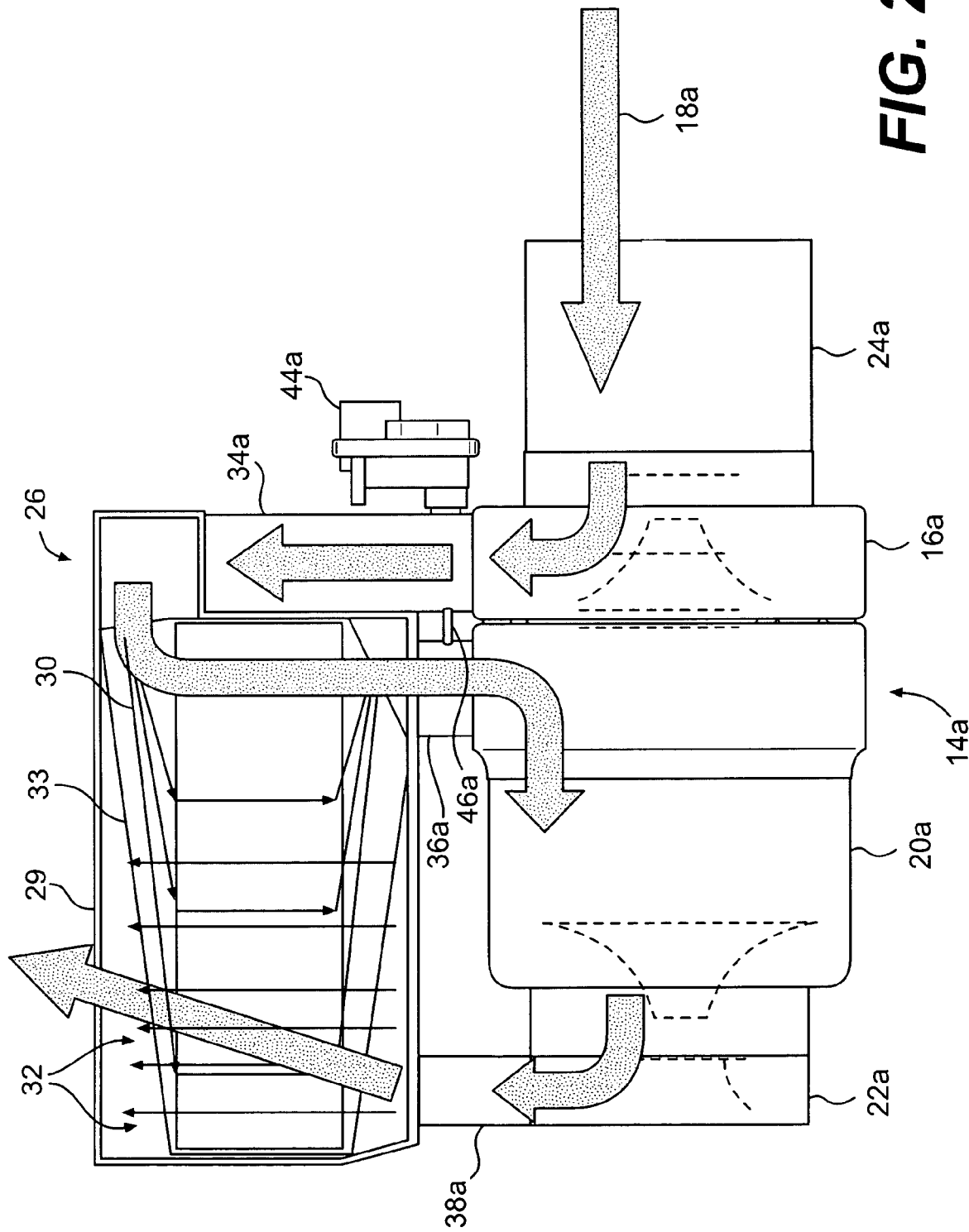
FIG. 2 is a schematic, partly cross-sectional view of a single gas turbine engine with a recuperator section.

Reference will be made here to both FIGS. 1 and 2 to describe the general nature of the various flow paths for air and exhaust gases. The first flow path for compressed air and the second flow path for hot exhaust gases are not designated in the highly schematic representation of FIG. 1. Referring to FIG. 2, which shows a diagrammatic side view in partial cross-section of a single gas turbine engine 14a and the recuperator section 26, the first flow path is represented generally in recuperator section 26 by the more or less downwardly trending arrows and designated generally by the numeral 30. The second flow path is represented generally in the recuperator section by the upwardly trending arrows and designated generally by the numeral 32.

Compressed air may flow through first flow path 30 while hot exhaust gases may flow through second flow path 32. The general flow of compressed air and hot exhaust gases through the gas turbine engine 14a and the recuperator section 26 is readily apparent from viewing FIG. 2. Continuing to refer to both FIGS. 1 and 2, air for compressor sections 16a-d may be provided by way of flow paths 18a-d, each designated as a third flow path. Compressed air exiting compressor sections 16a-d may be delivered to first flow path 30 within recuperator section 26 by way of flow paths 34a-d, each designated as a fourth flow path. Heated compressed air may be delivered back from recuperator section 26 to combustor sections 20a-d by way of flow paths 36a-d, each designated as a fifth flow path. Hot exhaust gases exiting from the turbine sections 22a-d may be delivered to second flow path 32 within recuperator section 26 by way of flow paths 38a-d, each designated as a sixth flow path.

First flow path 30 and second flow path 32 are separated from each other whereby compressed air and hot exhaust gases move along the two separate and distinct flow paths and do not mix with each other. During the flow of hot exhaust gases through the second flow path 32 and the flow of compressed air through the first flow path 30, heat from the hot exhaust gases is transferred to the relatively cooler compressed air. In this way, heat from the hot exhaust gases exiting the turbine sections 22a-d is recuperated and injected back into the system by the heated compressed air.

The internal structure of recuperator section 26 may vary significantly. The recuperator section 26 should be so structured that compressed air and hot exhaust gases are kept separate, and that the first flow path 30 and the second flow path 32 are arranged and configured in a way conducive to efficient heat transfer from the hot exhaust gases to the compressed air. For example, the internal structure of the recuperator section 26 may be formed as a multi-celled structure wherein a multiplicity of cells 33 are arranged adjacent to one another with each cell 33 being a unit including a multiplicity of tubes or channels through which compressed air may flow.

Referring to FIG. 2, the cross-section of a single cell 33 can be seen. Each cell 33 is a thin member mounted within the recuperator section 26 immediately adjacent another similar cell 33 such that the linear extent of the entire recuperator section 26, referring back to FIG. 1, is made up of a multiplicity of like cells 33 forming the multi-celled structure of the recuperator section 26. Adjacent cells 33 may contact one another to form a substantial number of tubes or channels between adjacent and contacting cells 33 through which hot exhaust gases may flow. The result is a structure wherein all the tubes or channels for compressed air are connected and form part of the first flow path 30. In like manner, all the tubes or channels through which hot gases may flow are likewise connected and form part of the second flow path 32.

Because recuperator section 26 may be formed of a multiplicity of like cells 33 arranged side-by-side, the structure is conducive to modular implementation of the turbine system. Referring now to FIG. 3, showing a multiple turbine system from which the cross-section in FIG. 2 has been taken, each of the several gas turbine engines is associated with a subsection 26a-d of recuperator section 26. However, the lines of demarcation 27 between subsections 26a-d indicate only a modular division and does not alter the fact that, regardless of the number of modules or subsections, there are only two flow paths for the entire recuperator section 26. It may be determined that longer term power demands dictate that the system have an additional gas turbine engine 14a-d. The feature of modular construction based on multiple like cells 33 permits the ready addition of other gas turbine engines to the system while maintaining only two flow paths for the entire recuperator section 26. Additional cells 33 accompanied by an extension of housing 29 readily accommodates an additional gas turbine engine 14a-d.

Work machine 10 may further include a mechanism 24a-d (shown diagrammatically in FIG. 3, for example) operably coupled to each gas turbine engine 14a-d. Any suitable direct or indirect drive connection (not shown) may couple the drive output of turbine section 22a-d to mechanism 24a-d. Reiterating, the particular mechanism that may be driven by a gas turbine engine 14a-d may vary with the type of work machine 10 and with the type of drive system employed on a given type of work machine 10. Each gas turbine engine 14a-d may drive a separate mechanism 24a-d, as shown in FIG. 3, or the several gas turbine engines 14a-d may be suitably configured, by way of gearing, for example, to drive a single mechanism. Mechanism 24a-d, whether plural mechanisms or a single mechanism, may be mechanical, hydraulic, electrical, or any other expedient useful to convert the output of gas turbine engines 14a-d to propulsion for a work machine 10 or to otherwise provide a desired driving function for the work machine 10.

Mechanism 24a-d may be, for example, the lower power train of a work machine 10, including gearing mechanically coupled to wheels (not shown) and/or ground engaging tracks (not shown). As previously noted, mechanism 24a-d may alternatively be a generator configured to convert mechanical energy developed by gas turbine engines 14a-d into electric energy for use as a power source to power, for example, one or more electric motors (not shown) configured to propel work machine 10.

Each of fourth flow paths 34a-d and fifth flow paths 36a-d may be provided with a suitable valve or flow control device to inhibit or block the flow of fluid from first flow path 30 within recuperator 26 at times such as, for example, when one or more of gas turbine engines 14a-d may be deactivated. For example, fourth flow paths 34a-d may be provided with a valve 40a-d, each designated a first valve, while sixth flow paths 36a-d may be provided with a valve 42a-d, each designated a second valve. It is contemplated that each of the first and second valves 40a-d and 42a-d may be any suitable type of flow control device useful for conveniently inhibiting or blocking flow of fluid within the fourth and fifth flow paths 34a-d and 36a-d.

First and second valves 40a-d and 42a-d may be check valves arranged to block fourth and fifth flow paths 34a-d and 36a-d in the event of deactivation of a given gas turbine engine. Alternatively, or additionally, first and second valves 40a-d and 42a-d may be controlled by an actuator 44a-d to close or open fourth and fifth flow paths 34a-d and 36a-d. In one embodiment, first and second valves 40a-d and 42a-d may be butterfly valves on a common shaft 46a-d and configured to be selectively actuated by actuator 44a-d. Other flow control devices and valve arrangements will become readily apparent to those having skill in the art after having been apprised of the herein disclosed embodiments.

The provision of multiple gas turbine engines, one or more of which may be independently activated or deactivated periodically, enables an effective and efficient way to accommodate varying power demands. The number of gas turbine engines 14a-d which may be grouped in a given work machine 10 or other working environment may vary with the maximum power demand in the environment in which the multiple gas turbine engines 14a-d are employed.

The exemplary work machine 10 in FIG. 1 has been illustrated with four gas turbine engines 14a-d. However, the number could just as well be three, or five, or any other number commensurate with the power requirements and other design considerations.

Referring again to FIG. 3, the multiple gas turbine engines 14a-d diagrammatically shown may be arranged adjacent a single, common recuperator section 26. In the embodiment of FIG. 3, four gas turbine engines 14a-d are shown in what may be referred to as a linear-pack arrangement. The four gas turbine engines 14a-d are arranged side-by-side in a space efficient manner adjacent and beneath common recuperator section 26. Actuators 44a-d and common shafts 46a-d may be seen in FIG. 2, while first and second valves 40a-d and 42a-d cannot be seen since they are located within fourth flow paths 34a-d and fifth flow paths 36a-d. Plainly, the linear-pack arrangement lends itself to a modular construction since the gas turbine engines and associated components may be substantially identical.

Viewing the left-hand end of the recuperator section 26 in FIG. 3, it can readily be visualized that an additional gas turbine engine and accompanying modular subsection 26a-d may be added. In doing so, the recuperator section 26 would be extended lengthwise. Regardless of how many gas turbine engines and accompanying subsections may be added, the effect is to add additional cells 33 of the multi-celled structure with their tubes or conduits to existing first and second flow paths such that there remains but a single, common recuperator section 26.

Figure 4:
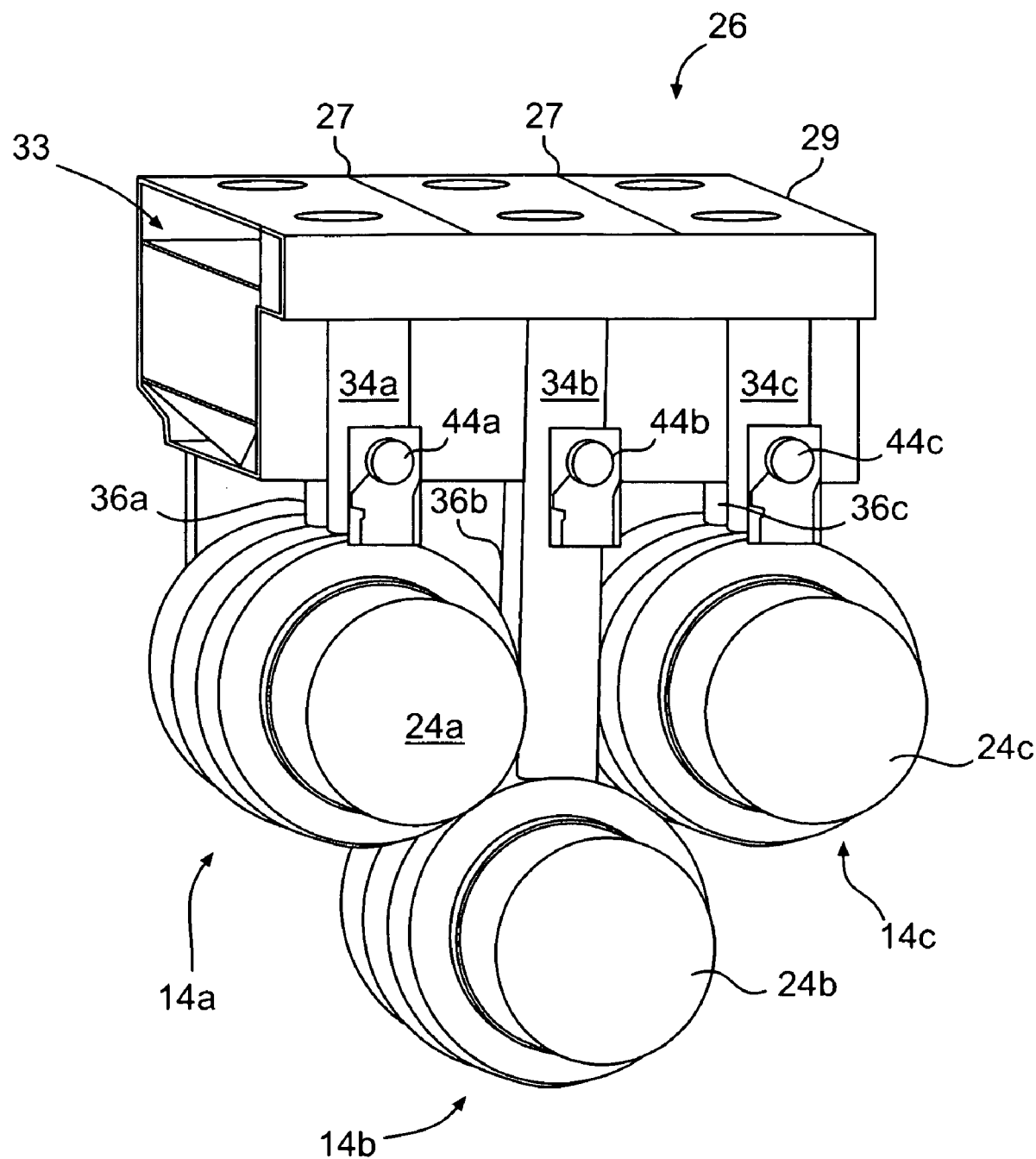
FIG. 4 is a diagram of an embodiment of a plurality of gas turbine engines in a dense-pack configuration and having a single, common recuperator section.

FIG. 4 diagrammatically illustrates another embodiment employing three gas turbine engines 14a-c in what may be referred to as a dense-pack arrangement. The three gas turbine engines 14a-c are arranged closely spaced to one another in a more or less triangular, space efficient manner adjacent and beneath common recuperator section 26. Actuators 44a-c may be seen in FIG. 4 along with fourth and fifth flow paths 34a-c and 36a-c, but valves 40a-c and 42a-c may not be seen in FIG. 4. As is the case with the embodiment of FIG. 3, actuators 44a-c may operate a common shaft 46a-c (not shown in FIG. 4) to control the valves 40a-c and 42a-c. As was the case with FIG. 3, it is readily apparent that additional cells 33 may be added in modular fashion to accommodate any addition of another gas turbine engine that may be necessary or desireable.

INDUSTRIAL APPLICABILITY

In the exemplary work machine 10 schematically depicted in FIG. 1, gas turbine engines 14a-d provide mechanical power for work machine 10. Compressor sections 16a-d draw in and compress intake air by way of, for example, flow paths 18a-d. Once compressed in compressor sections 14a-d, compressed air enters recuperator section 26, where the compressed air may be heated by hot gases exhausted from turbine sections 22a-d. Following heating, the compressed air may be fed into combustor sections 20a-d, which may receive fuel from fuel injection devices 28a-d. Combustor sections 20a-d ignite the compressed air and fuel, thereby creating heated, high energy exhaust gases.

The heated exhaust gases may be passed through turbine sections 22a-d, which convert energy in the heated exhaust gases into mechanical energy as the heated exhaust gases pass through turbine sections 22a-d. Once the hot exhaust gases exit turbine sections 22a-d, they may be fed into recuperator section 26 via flow paths 38a-d. Within recuperator section 26, and referring now to FIG. 2, the hot exhaust gases flow through the second flow path 32 which may include, for example, a multiplicity of passages within a multi-celled structure providing an extensive heat transfer surface. Compressed air enters the recuperator section 26 from the compressor sections 16a-d and flows through the first flow path 30 which may include, for example, a multiplicity of passages within the multi-celled structure that accommodates the hot exhaust gases. Flow of hot exhaust gases and compressed air through the multi-celled structure within the recuperator section 26 enables the hot exhaust gases to heat the compressed air within the recuperator section 26 via heat transfer surfaces. The exhaust gases may thereafter be exhausted to the atmosphere while the now heated compressed air may be delivered, via flow paths 36a-d, to the combustor sections 20a-d.

Mechanisms 24a-d (shown diagrammatically in FIG. 3), driven by the gas turbine engines 14a-d, convert the energy output of gas turbine engines 14a-d into suitable work, such as propulsion for work machine 10. In the embodiment of FIG. 1, for example, the driven mechanisms may be generators, suitably coupled to each respective gas turbine engine 14a-d, which convert mechanical energy developed by gas turbine engine 14a-d into electric energy for use as a power source. For example, one or more electric motors (not shown) may be powered by the generators and may be configured to propel work machine 10, for example, via ground engaging members such as wheels and/or a pair of ground engaging tracks.

During operation of work machine 10, power requirements may vary substantially. To accommodate varying power requirements, either all of the multiple gas turbine engines 14a-d may be activated for maximum power, or, when less power is required, one or more of multiple gas turbine engines 14a-d may be deactivated. Thus, each gas turbine engine 14a-d may be selectively and individually activated or deactivated.

Referring to the exemplary embodiment shown in FIG. 1, where 100% power is required, all four gas turbine engines 14a-d may be activated. In such a situation, all of valves 40a-d and 42a-d are activated by the actuators 44a-d, for example, to permit the flow of compressed air from compressor sections 16a-d to recuperator section 26, and to permit the flow of heated compressed air from recuperator section 26 to combustor sections 20a-d. Within recuperator section 26, the compressed air exiting from each of the compressor sections 16a-d mingles with the compressed air exiting from all other compressor sections 16a-d in first flow path 30. At the same time within recuperator section 26, the hot exhaust gases exiting from each of turbine sections 22a-d mingles with the hot exhaust gases exiting from all other turbine sections 22a-d in second flow path 32.

Referring again to the exemplary embodiment of FIG. 1, where between 50% and 75% power is required, one gas turbine engine 14a-d, such as gas turbine engine 14a, may be deactivated. In such a situation, valves 40a and 42a may be actuated by actuator 44a to block flow paths 34a and 36a. Compressed air exiting compressor sections 16b-d may enter first flow path 30, recuperate heat while in first flow path 30 from the hot exhaust gases within flow path 32, and then enter combustor sections 20b-d. During this time, since valves 40a and 42a block the flow paths 34a and 36a, flow of heated compressed air to the deactivated gas turbine engine 14a is inhibited.

When between 25% and 50% power is required, two gas turbine engines 14a-d may be deactivated. In like manner, when 25% or less power is required, three gas turbine engines 14a-d may be deactivated. In each case, the entire extent of both first flow path 30 and second flow path 32 is utilized for recuperating heat energy. Thus, even when three of four gas turbine engines, such as 14a, 14b, and 14c, are deactivated, the remaining activated gas turbine engine 14d continues to utilize all of first flow path 30 for compressed air and all of second flow path 32 for hot exhaust gases.

Providing a single, common recuperator section shared by a plurality of gas turbine engines enables a substantial conservation of energy when using gas turbine engines. Gas turbine engines operate most efficiently and with optimum fuel economy when operated for relatively long time periods and at high load. The use of multiple gas turbine engines permits accommodating varying load requirements by completely deactivating one or more gas turbine engines when power requirements vary for significant periods of time. By maintaining operation of some of a plurality of gas turbine engines at full load, efficiency and fuel economy is achieved.

Shutting down a gas turbine engine with its own individual recuperator section and then restarting the gas turbine engine subjects the recuperator section to the thermal shock inherent in intermittent shut down and restarting. While recuperator design generally accommodates the high temperatures involved in gas turbine engine operation, frequent cycling by shut down and restarting can substantially shorten the life of the recuperator section. By coupling multiple gas turbine engines to a single, common recuperator section, the problem of thermal shock from frequent cycling is substantially mitigated. The life of the recuperator section is thus extended.

The space efficient arrangement, either linear-pack or dense-pack configuration, of multiple gas turbine engines adjacent a single, common recuperator section wherein both the flow paths for compressed air to be heated and hot exhaust gases from which heat is to be recuperated are shared by all of the multiple gas turbine engines achieves space economy and fuel economy. In addition, the ability to selectively shut down or deactivate one or more of the multiple gas turbine engines while using the entire recuperator volume for the remaining activated gas turbine engines gives a degree of control which, given the fuel economy achieved, potentially expands the feasibility of using gas turbine engines as a prime mover.

The use of a multi-celled structure whereby the recuperator section is build up from a multiplicity of like cells enables a modular arrangement whereby the number of gas turbine engines made be altered by either adding or removing one or more gas turbine engines when the demands of a particular environment of use dictate. Where, for example, one gas turbine engine is added, the use of only two flow paths shared by the entire recuperator section can be maintained by adding more cells and extending the housing.

In general, a larger recuperator section leads to a more efficiently operating gas turbine engine. Where, for example, four gas turbine engines are operated together, the system may be designed with a recuperator section that is efficient, taking into account space and design considerations. As one or more gas turbines are temporarily deactivated to accommodate reduced power requirements, the efficiency of the remaining activated gas turbine engine or engines is enhanced by reason of the effective increase in recuperator volume, both for flow of the compressed air and for flow of the hot exhaust gases. In addition, the life of the recuperator section is lengthened since the entire recuperator stays hot despite the fact that one or more turbines may be temporarily deactivated in accordance with power demands.

For purposes of illustration, embodiments with three and with four gas turbine engines have been shown and described to diagrammatically depict the system and method disclosed. However, it will be understood by those skilled in the art that any number of gas turbine engines may be employed commensurate with the particular system design and power requirements. In addition, the particular arrangement of conduits, piping, ductwork, etc., operating as flow paths for intake air, compressed air, and hot exhaust gases may vary in accordance with design and space considerations. The arrangements illustrated diagrammatically in FIGS. 1 and 2 are intended to be exemplary, not limiting. Additionally, the linear-pack and dense-pack configurations of FIGS. 2 and 3 are exemplary. Other arrangements, depending on the number of gas turbine engines employed, space considerations, and design considerations, will become apparent to those having skill in the art when apprised of the herein disclosed embodiments.

It will be apparent to those skilled in the art that other modifications and variations can be made to the disclosed multiple turbine system and method. For example, while the system has been disclosed primarily in connection with a work machine, it will be apparent that the method and system could be employed in a stationary system wherein multiple gas turbine engines drive a generator or a plurality of generators which, in turn, provide electric power. Additionally, it is contemplated that the disclosed system and method are applicable to any type of vehicle, or to work machines that are stationary. Other embodiments will be apparent to those skilled in the art from consideration of the specification and practice of the disclosed method and system. It is intended that the specification and examples be considered as exemplary only, with a true scope being indicated by the following claims and their equivalents.

What is claimed is:

1. A turbine system comprising:
a plurality of gas turbine engines, each having a compressor section for producing compressed air, a combustor section, and a turbine section yielding hot exhaust gases;
a single, common recuperator section shared by and operatively associated with the plurality of gas turbine engines;
a first flow path within the single, common recuperator section and configured to receive compressed air produced by the compressor section of each gas turbine engine; and
a second flow path, separated from the first flow path, within the single, common recuperator section, and configured to receive hot exhaust gases yielded by the turbine section of each gas turbine engine.

2. The system of claim 1, wherein the plurality is three and the three gas turbine engines are arranged in a dense-pack configuration adjacent the single, common recuperator section.

3. The system of claim 1, wherein the plurality is four and the four gas turbine engines are arranged in a linear-pack configuration adjacent the single, common recuperator section.

4. The system of claim 1, wherein each of the plurality of gas turbine engines is configured to be selectively and individually activated and deactivated.

5. The system of claim 1, wherein each of the plurality of gas turbine engines includes:
a third flow path configured to direct air to the compressor section;
a fourth flow path configured to direct compressed air from the compressor section to the first flow path within the single, common recuperator section;
a fifth flow path configured to direct compressed air from the first flow path within the single, common recuperator section to the combustor section; and
a sixth flow path configured to direct exhaust gas from the turbine section to the second flow path within the single, common recuperator section.

6. The system of claim 5, wherein each of the plurality of gas turbine engines is configured to be selectively and individually activated and deactivated, and further including a first valve in each fourth flow path configured to direct compressed air from the compressor section to the first flow path within the single, common recuperator section, each first valve configured to be selectively actuated to close the fourth flow path when its respective gas turbine engine is deactivated, and each first valve configured to be selectively actuated to open the fourth flow path when its respective gas turbine engine is activated.

7. The system of claim 6, further including a second valve in each fifth flow path configured to direct compressed air from the first flow path within the single, common recuperator section to the combustor section, each second valve configured to be selectively actuated to close the fifth flow path when its respective gas turbine engine is deactivated, and each second valve configured to be selectively actuated to open the fifth flow path when its respective gas turbine engine is activated.

8. The system of claim 1, wherein the single, common recuperator section includes a multi-celled structure and the first and second flow paths include portions of the multi-celled structure.

9. A work machine, comprising:
- a chassis;
- a plurality of gas turbine engines mounted to the chassis and configured to drive at least one mechanism, each gas turbine engine including a compressor section for producing compressed air, a combustor section, and a turbine section yielding hot exhaust gases;
- a single, common recuperator section mounted on the chassis and shared by and operatively associated with the plurality of gas turbine engines;
- a first flow path for compressed air produced by the compressor sections, the first flow path being within the recuperator section and shared by each of the plurality of gas turbine engines; and
- a second flow path separated from the first flow path, for hot exhaust gases yielded by the turbine sections, the second flow path being within the recuperator section and shared by each of the plurality of gas turbine engines.

10. The work machine of claim 9, wherein the plurality off gas turbine engines includes at least three gas turbine engines arranged in a dense-pack configuration and each configured to be selectively and individually activated and deactivated.

11. The work machine of claim 10, including at least one valve associated with each gas turbine engine for inhibiting flow of compressed air from the recuperator section to a deactivated gas turbine engine.

12. The work machine of claim 9, wherein the plurality of gas turbine engines includes at least four gas turbine engines arranged in a linear-pack configuration and each configured to be selectively and individually activated and deactivated.

13. The work machine of claim 12, including at least one valve associated with each gas turbine engine for inhibiting flow of compressed air from the recuperator section to a deactivated gas turbine engine.

14. The work machine of claim 9, wherein the at least one mechanism includes at least one generator.

15. The work machine of claim 9, wherein the single, common recuperator section includes a multi-celled structure and the first and second flow paths include portions of the multi-celled structure.

* * * * *